United States Patent
Ahlbeck et al.

(10) Patent No.: US 6,416,724 B1
(45) Date of Patent: Jul. 9, 2002

(54) METHOD FOR CLEANING OF COMBUSTION GAS CONTAINING IMPURITIES

(75) Inventors: Jarl Ahlbeck, Kristinestad; Frej Bjondahl, Abo; Juha Huotari, Jyväskylä; Jan Isaksson, Turku; Erkki Mustonen, Helsinki; Maija Vihma, Turku; Tarja Virtanen, Tampere, all of (FI)

(73) Assignees: Tamfelt OYJ ABP, Tampere; Partek Nordkalk OY AB, Parainen; Sermet OY, Kiuruvesi, all of (FI)

( * ) Notice: Subject to any disclaimer, the term of this patent is extended or adjusted under 35 U.S.C. 154(b) by 0 days.

(21) Appl. No.: 09/380,397
(22) PCT Filed: Mar. 24, 1998
(86) PCT No.: PCT/FI98/00258
§ 371 (c)(1), (2), (4) Date: Sep. 15, 1999
(87) PCT Pub. No.: WO98/42432
PCT Pub. Date: Oct. 1, 1998

(30) Foreign Application Priority Data

Mar. 24, 1997 (FI) .................................................. 971215

(51) Int. Cl.$^7$ ............................................. B01D 53/74
(52) U.S. Cl. ................ 423/210; 423/240 R; 423/240 S; 423/243.01; 423/243.08; 423/244.01; 423/244.07
(58) Field of Search .................... 423/243.08, 243.01, 423/240 R, 240 S, 210, 244.01, 244.07

(56) References Cited

U.S. PATENT DOCUMENTS 5,246,471 A   9/1993  Bhat et al. ..................... 55/223

FOREIGN PATENT DOCUMENTS

| EP | 0121431 A2 | | 10/1984 | |
| EP | 0691153 A1 | | 1/1996 | |
| FI | 85226 | | 11/1991 | |
| FR | 2685451 A1 | | 6/1993 | |
| JP | 4-300625 A | * | 10/1992 | ............ 423/244.07 |
| JP | 5-168825 A | * | 7/1993 | ............ 423/244.07 |
| JP | 6-254342 A | * | 9/1994 | ............ 423/244.01 |
| WO | WO 89/07974 | * | 9/1989 | ............ 423/244.01 |

OTHER PUBLICATIONS

Merriam–Webster's Collegiate Dictionary, 10th Edition, by Merriam–Webster Inc., Springfield Massachussetts USA; ISBN–0–87779–708–0; p. 163, 1997.*

* cited by examiner

Primary Examiner—Steven P. Griffin
Assistant Examiner—Timothy C. Vanoy
(74) Attorney, Agent, or Firm—Connolly Bove Lodge & Hutz

(57) ABSTRACT

A method is provided for cleaning a combustion exhaust gas containing impurities, such as sulfur oxides and hydrochloric acid, with an additive, such as calcium hydroxide, in a reactor. The combustion gas is passed into a wetting zone where water is injected into the gas. The wet combustion gas is then passed through additive injection zone where the additive is co-currently injected into the combustion gas at a location near the bottom of the injection zone. The additive injection zone is connected to the top of the wetting zone and expands conically outward from the gas discharge outlet of the wetting zone so that as the combustion gas (and additive) travel upward through the additive injection zone the velocity of the combustion gas (and additive) is decreased. The combustion gas and additive are then passed through a cylindrical section having a uniform diameter of a given height and connected to the top of the additive injection zone. The combustion gas is then discharged from the reactor and passed through a filtering unit for removal of solids.

24 Claims, 1 Drawing Sheet

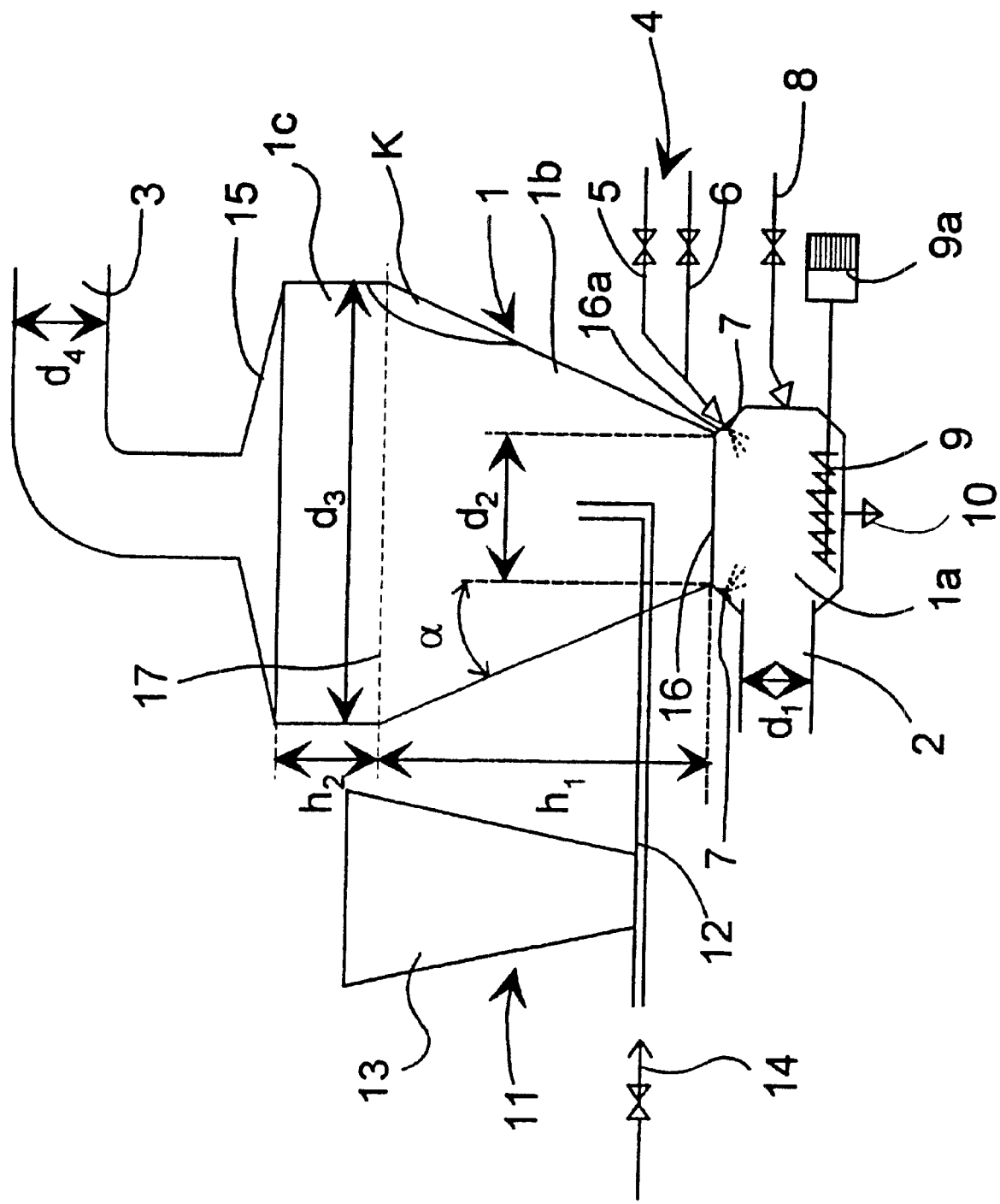

METHOD FOR CLEANING OF COMBUSTION GAS CONTAINING IMPURITIES

CROSS REFERENCE TO RELATED APPLICATION

The present application is a 371 of PCT/FI98/00258, filed Mar. 24, 1998.

FIELD OF THE INVENTION

The present invention relates to a method for cleaning of combustion gas containing impurities in a reactor plant.

BACKGROUND OF THE INVENTION

The present invention provides that combustion gas to be cleaned is supplied to a lower part of a reactor vault, wherefrom it is directed to flow substantially vertically upwards, and to exit at the upper part of the reactor vault to an after-treatment or the like, wherein the combustion gas is wetted with a wetting agent in the first phase of the cleaning process of the combustion gas, in the second phase of the cleaning process of the combustion gas at least one additive reacting with impurities of the combustion gas, particularly with sulphur compounds and sulphur oxides, is supplied to the combustion gas that is wetted with a wetting agent, and in the third phase of the process, the speed of the upwards directed flow of the combustion gas that has been treated with a wetting agent and an additive is retarded in the retardation zone of the reactor vault by enlarging the horizontal cross-section area of the reactor vault in the flow direction of the combustion gas.

A method of the above-mentioned kind is known from publication EP-121431. In the method of the publication the supply of combustion gases is carried out to the lower part of the reactor vault, whereafter wetting of combustion gases is performed and alkali used as an additive and reacting with sulphur compounds of combustion gas is added. The combustion gas exits at the upper part of the reactor vault. However, publication EP 121431 presents no disclosure in what manner it is attended to in the process and the construction of the reactor vault that the combustion gas handled with the wetting agent and the additive reacting with impurities would have a sufficient retention time in the reactor vault. A sufficient retention time ensures for the first that the wetting of the combustion gas will be succeeded. Second, mixing of the wetted combustion gas and the additive as well as chemical reactions require a certain time. Further, sufficient drying of exiting combustion gases (removal of wetting agent drops) should be secured before the combustion gas is removed from the reactor vault.

BRIEF SUMMARY OF THE INVENTION

It is an aim of the present invention to present a method by which it is possible to a great extent to eliminate the drawbacks of prior art in a manner that the impurities of the combustion gas exiting the reactor vault of the reactor plant, particularly sulphur oxides that have reacted with water in connection with wetting, have reacted with the additive, and the combustion gas is free from wetting agent drops to the extent that it is possible to avoid harmful chemical additional reactions from taking place in the after-treatment of combustion gases, particularly in a filter. For attaining this purpose, the method of the present invention is primarily characterised in that in the fourth phase of the cleaning process of the combustion gases, the average flowing speed of the combustion gas flow is standardised to correspond substantially to the end speed of the combustion gas flow of the third phase of the process by forming in the reactor vault a retention zone having a substantially standardised horizontal cross section after the retardation zone to form an extension to the same, and that the combustion gases are removed from the reactor vault after the retention zone.

By using the above-described solution, advantageously in combination with a filter, preferably a fibre filter, a method is obtained by which it is possible to economically resolve simultaneous removal of sulphur compounds and particles particularly, but not exclusively, in small and medium sized combustion plants (1 to 50 MW). Treating combustion gas containing sulphur oxides ($SO_x$) with alkali compounds, particularly with calcium hydroxides is a generally known method for binding harmful sulphur to an alkali compound. However, the reactions require that the sulphur oxides and alkali oxides, in particular calcium hydroxide, are in an aqueous solution. The structure of the reactor vault has to be designed in a manner that there is sufficient time also for these reactions to take place. On the other hand, it is not sensible to discharge combustion gas containing wetting agent drops from the reactor vault, since it is advantageous in combustion plants to add to the treatment of combustion gas a filter positioned after the reactor plant and intended for dust removal, in which filter the occurrence of acidic sulphur compounds dissolved in water is very harmful. The method according to the present invention resolves the above-described problem complex in a manner that in the retardation zone which enlarges upwards in the flow direction of the combustion gases brings about a sufficient retention time for the combustion gas and thus, at the same time, a sufficient reaction time, since with an appropriate selection for the drop size the retention of the wetting agent drops is longer than the retention of the combustion gas. The retention zone forming an extension to the retardation zone ensures that the combustion gases leaving the upper part of the reactor vault do not contain wetting agent drops, so harmful sulphur compounds dissolved in water exist neither after the reactor vault in the combustion gas nor thus in the filter intended for dust removal of the combustion gas.

The accompanying dependent claims describe some advantageous embodiments of the method in accordance with the present invention.

BRIEF DESCRIPTION OF THE DRAWING

FIG. 1 Vertical cross-section schematic of the reactor plant of the present invention.

DETAILED DESCRIPTION OF THE INVENTION

The invention will be illustrated in more detail in the following specification with reference made to the enclosed drawing presenting schematically a vertical cross section of an advantageous embodiment of a reactor plant employing the method of the invention.

Referring to FIG. 1, a reactor plant employing a method of the invention comprises as its main parts a reactor vault 1 having in the lower part thereof an input channel 2 for the combustion gas and in the upper part an outlet channel 3 for the combustion gas. Input channel 2 has a diameter $d_1$ and output channel 3 has a diameter $d_4$. Further, the reactor plant comprises a supply arrangement 4 for wetting agent of the combustion gas, said arrangement comprising a wetting agent line 5 and a supply line 6 for compressed air, these having a connection with nozzles 7 in the reactor vault. Further, the lower part of the reactor vault has a rinsing water aggregate 8, a mixer 9 with an actuator 9a thereto, as well as an outlet aggregate 10 for removal of a liquid phase situated on the bottom of the reactor vault. The reactor device includes further a supply unit 11 for the additive reacting with the wetted combustion gas, said unit comprising a supply tube 12 in combination with a storage container 13 for the additive. To the supply tube 12 is connected a supply arrangement for the additive, e.g. an input for compressed air 14.

The reactor vault 1 is divided into three main parts, the lowermost of which being formed by a wetting zone 1a having a connection with the input channel 2 for the combustion gas, the middle one being formed by a retardation zone 1b and the uppermost by a retention zone 1c connected to the outlet channel 3 related to a conical top 15 of the reactor vault 1. $H_2$ is the height of retention zone 1c.

The wetting zone 1a is formed by means of the walls of the reactor vault to have a substantially cylindrical form, wherein the wetting nozzles 7 are placed in the upper part of the wetting part to surround a horizontal aperture 16 having a contact with the retardation zone 1b. The retardation zone 1b starts at the level of said aperture 16 and continues upwards as a conically enlarging part. As can be discovered in the drawing, the horizontal cross-section area of the aperture 16 is smaller than the horizontal cross-section area of the wetting vault 1a, wherein in the upper part of the wetting zone 1a, around the aperture 16 is formed an annular cam structure 16a, having said wetting nozzles 7 placed in its lower surface, wherein they are positioned covered in a manner that layers K possibly draining down the walls of the retardation zone 1b pass the wetting nozzles 7 without damaging them when falling to the bottom of the wetting zone 1b to be removed via the outlet aggregate 10.

In the described embodiment, the retardation zone 1b is formed to open upwards in a conical manner, but it is substantial to the general structure of the retardation zone 1b in the purpose of the invention that the horizontal cross-section area of the retardation zone 1b enlarges in the flow direction of the combustion gas upwards. In the combustion gas wetted with wetting agent, the additive is supplied centrally at the level of the aperture 16 or directly thereabove substantially downstream in the flow direction of the combustion gas, i.e. upwards in a manner that the additive mixes with the wetted combustion gas as evenly as possible.

As an extension to the retardation zone in the upper part of the reactor vault there is a retention zone 1c, having a substantially constant horizontal cross-section area. The retention zone 1c is advantageously formed to be a cylindrical part having a diameter corresponding to the upper diameter of the conical form piece of the retardation zone 1b, i.e. the size and form of the aperture 17. Subsequent to the retention zone 1c the top 15 of the reactor vault 1 is formed by a gathering cone in which the outlet channel 3 for the combustion gases is coupled in a manner that it is directed preferably upwards and centrally with the centre line of the retardation zone 1b and retention zone 1c.

The method operates according to the following manner. In the first phase of the cleaning process the combustion gas that comes to the reactor vault 1 via the input channel is wetted with wetting agent particularly with water brought about into shower form by compressed air. The size range of the water drops is medium, which means that the drops cannot be too small, wherein the wetting (absorption) of the combustion gases is of too brief duration the combustion gas dries too fast in the retardation zone 1b. On the other hand, the drop size cannot be too large, wherein the drops remain in the wetting zone and drain or fall to its bottom not finding their way either to the aperture 16 or upwards therefrom. By appropriate selection of drop size such composition for the combustion gas is obtained in the entire area of the retardation zone 1b of the reactor vault that humidity conditions necessary for attaining chemical reactions exist in the whole humidity measure $h_1$ of the retardation zone 1b.

In the lower part of the retardation zone, the second phase of the cleaning process takes place, wherein to the combustion gas wetted with the wetting agent a powder like additive is supplied from the additive-supply unit 11, e.g. by means of compressed air. The additive is usually a suitable alkali compound, a particularly suitable compound is calcium hydroxide reacting with sulphur oxides and hydrocloric acid and other acidifying compounds.

In the retardation zone, the flowing speed of the combustion gas is retarded in a manner that the ratio $V_{SA}$=the initial average speed of combustion gas/$V_{SL}$=the final average speed is 10 to 40. This lowering of flowing speed of the combustion gas in the retardation zone results, in most practical embodiments where the retardation zone 1b is conical, in the fact that an upwards opening conical angle of the conical form piece of the retardation zone is 10° to 20°, preferably about 15°, wherein the definition formula used for the angle and/or the height $h_1$ of the retardation zone 1b is $$\tan\alpha = \frac{(d_3 - d_2)}{2 \cdot h_1}, \tag{1}$$

wherein in the formula

α=upwards opening conical angle, $h_1$=height of the conical retardation zone 1b, $d_2$=diameter of the aperture 16 in the lower part of the retardation zone 1b, and $d_3$=diameter of the aperture 17 in the upper part of the retardation zone 1b.

The retarding flow of the wetted combustion gas that has been treated with an additive takes place in the retardation zone 1b, upwards, wherein a long retention time is ensured for the combustion gases and thus, at the same time, a long reaction time for the reactions taking place in moist conditions required between the additive and the impurities, mainly sulphur oxides and possibly hydrochloric acid. At the same time the size of the drops is decreasing due to drying and in the retardation zone 1b, in the upwards moving combustion gas flow, the drop size is decreasing.

The final drying of wetting agent drops in the combustion gas takes place in the retention zone 1c, wherein the combustion gas leaving the outlet channel 3 contains no wetting agent drops. Significant layers K are not generated in the walls of the retention zone. In case these are generated, they drain downwards along the walls of the retardation zone 1b and fall on the bottom of the reactor vault. Further, the draining slows down the downwards directing speed of the layers to the extent that they do not cause harm when falling on the bottom of the reactor vault 1.

The diameters of the apertures 16, 17 in the bottom part and upper part of the retardation zone 1b are defined in the formulas:

$$d_2 = 0,075 \cdot \sqrt{\frac{m \cdot (273 + \theta_1)}{p \cdot (\pi + 0,0628 \cdot D_{50})}}, \text{ and} \quad (2)$$

$$d_3 = 0,075 \cdot \sqrt{\frac{m}{p} \cdot (273 + \theta_2) \cdot \left(0,7692 + \frac{\theta_1 - \theta_2}{1718 + 1.299 \cdot \theta_2}\right)}, \quad (3)$$

wherein
- $d_2$=diameter of the aperture (16) in the lower part of the retardation zone (1b),
- $d_3$=diameter of the aperture (17) in the upper part of the retardation zone (1b),
- m=mass flow (kg/s) of the combustion gas,
- p=total pressure (bar) of the combustion gas,
- $\theta_1$=initial temperature (° C.) of the combustion gas,
- $\theta_2$=end temperature (° C.) of the combustion gas,
- $D_{50}$=median diameter (μm) of the drops.

The height of the retention zone 1c is defined by using the formula $$h_2 = \frac{4 \cdot G2 \cdot G3}{\pi \cdot d_1^2}, \quad (4)$$

wherein the terms G2 and G3 are defined in the following manner:

$$F1 = \frac{\pi \cdot d_2^2 + \pi \cdot d_1^2}{8} \cdot h_1, \quad (5)$$

$$F2 = \frac{\theta_1 - \theta_2}{\ln\frac{\theta_1}{\theta_2}}, \quad (6)$$

$$F3 = \frac{m}{p} \cdot 2,858 \cdot (273 + F2) \cdot 10^{-3}, \quad (7)$$

$$G1 = F1/F3 \quad (8),$$

$$G2 = 5.0 - G1 \quad (9),$$

$$G3 = F3 \cdot \frac{(273 + \theta_2)}{(273 + F2)}, \quad (10)$$

wherein in the formulas
- $h_1$=height of the conical retardation zone (1b),
- $d_2$=diameter of the aperture (16) in the lower part of the retardation zone (1b),
- $d_3$=diameter of the aperture (17) in the upper part of the retardation zone (1b),
- m=mass flow (kg/s) of the combustion gas,
- p=total pressure (bar) of the combustion gas,
- $\theta_1$=initial temperature (° C.) of the combustion gas,
- $\theta_2$=end temperature (° C.) of the combustion gas,
- $D_{50}$=median diameter (μm) of the drops.

The cleaned combustion gas is directed to a filter arranged for dust removal of the combustion gas, particularly to a fibre filter (not shown), where the filtering of particulate dust of the combustion gas, which does not contain wetting agent in drop form, takes place.

Thus, the method contains an operational entirety fulfilling the following operational requirements:

I) Large wetting agent drops do not reach the retardation zone 1b,

II) Medium size wetting agent drops join the combustion gas flow, wet the combustion gas and confront the additive, III) The combustion gas in the upper part of the reactor vault contains no wetting agent drops.

As to the requirements I to III, the requirement I is fulfilled by the measuring formula (2) for the aperture 16 in the lower part of the retardation zone 1b. In a corresponding manner, II is fulfilled by the measuring formula (3) for the aperture 17 in the upper part of the retardation zone 1b. The requirements I and II involve also the formula (1), on the basis of which, after the measuring of the apertures (i.e. $d_2$ and $d_3$), the facients of the product $h_1 \cdot \tan\alpha$, i.e. $h_1$ and $\alpha$ are defined. Further, the definition formula for the height of the retention zone 1c fulfils the requirement III.

What is claimed is:

1. A method for cleaning impurities from combustion gas, the method comprising the steps of:
    (a) providing a reactor vault formed of walls having at least an inner surface and further comprising:
        (i) a wetting zone, forming the lowermost portion of said reactive vault, wherein the uppermost portion of the walls of said wetting zone are arranged to slope inwardly forming above said walls a substantially horizontal aperture having a smaller horizontal cross-sectional area than the lower portions of said wetting zone, said inwardly sloping uppermost portion of said walls of said wetting zone are provided with nozzles mounted thereon, said nozzles provide a supply of wetting agent and compressed air, and wherein said wetting zone receives a supply of combustion gas, comprising impurities, provided at a lower portion thereto;
        (ii) a retardation zone, mounted on said wetting zone and above said aperture, wherein said retardation zone is an upwardly-opening conic section, wherein the lower portion of said retardation zone is provided with a co-axially-mounted feed tube having supplies of compressed air and reactive additive connected thereto, said feed tube oriented to discharge in the upward direction;
        (iii) a substantially cylindrical retention zone, mounted on said retardation zone; and
        (iv) a top, mounted on said retention zone, comprising a downwardly-opening gathering cone having a centrally-disposed opening, and an outlet channel coupled to said opening, and wherein any horizontal cross-section of said reactor vault is substantially circular;
    (b) flowing said combustion gas upwardly through said wetting zone at an average initial flow speed, wherein said gas flows under substantially laminar flow conditions;
    (c) wetting said combustion gas in said wetting zone;
    (d) contacting said combustion gas with at least one reactive additive by allowing said reactive additive to flow in the flow direction of said combustion gas in said upwardly opening retardation zone, wherein the combustion gas and the additive flow through the retardation zone without contacting any turbulence generation means;
    (e) increasing the time said at least one reactive additive contacts said gas by reducing the average flow speed of said combustion gas in said retardation zone such that at the exit of said retention zone said gas has an average final flow speed lower than said average initial flow speed; and (f) removing said gas from said reactor vault through said top.

2. A method for cleaning impurities from combustion gas, according to claim 1, wherein said impurities comprise sulfur compounds.

3. A method for cleaning impurities from combustion gas, according to claim 2, wherein the reactive additive reacts with said sulfur compounds.

4. A method for cleaning impurities from combustion gas, according to claim 2, wherein the reactive additive reacts with said sulfur oxides.

5. A method for cleaning impurities from combustion gas, according to claim 1, wherein said impurities comprise sulfur oxides.

6. A method for cleaning impurities from combustion gas, according to claim 1, wherein said wetting agent comprises water.

7. A method for cleaning impurities from combustion gas, according to claim 1, wherein the reactive additive comprises an alkali compound.

8. A method for cleaning impurities from combustion gas, according to claim 1, wherein the reactive additive comprises calcium hydroxide.

9. A method for cleaning impurities from combustion gas, according to claim 1, wherein the reactive additive comprises a powder.

10. A method for cleaning impurities from combustion gas, according to claim 1, wherein said impurities comprise an acidic compound.

11. A method for cleaning impurities from combustion gas, according to claim 1, wherein said impurities comprise hydrochloric acid.

12. A method for cleaning impurities from combustion gas, according to claim 1, further comprising the step of:

retarding the speed of said combustion gas in said retardation zone such that the ratio of said average initial flow speed to said average final flow speed is from about 10 to about 40.

13. A method for cleaning impurities from combustion gas, according to claim 1, wherein a lowermost portion of said wetting zone is substantially cylindrical and has a first horizontal cross-sectional area; and said aperture has a second horizontal cross-sectional area smaller than said first horizontal cross-sectional area; wherein said aperture forms the bottom of said retardation zone; and wherein said combustion gas is wetted in said wetting zone.

14. A method for cleaning impurities from combustion gas, according to claim 1, further comprising the steps of:

(a) injecting said reactive additive through said feed tube substantially in the direction of flow of said combustion gas; and (b) contacting said combustion gas with said at least one reactive additive substantially in said bottom of said retardation zone.

15. A method for cleaning impurities from combustion gas, according to claim 1, wherein said aperture is a first aperture at the lowermost portion of said retardation zone and wherein the diameter of said first aperture is given by the equation:

$$d_2 = 0.075 \cdot \sqrt{\frac{m \cdot (273 + \theta_1)}{p \cdot (\pi + 0.0628 \cdot D_{50})}}$$

and wherein the top of said retardation zone comprises a second aperture wherein the diameter of said second aperture is given by the equation:

$$d_3 = 0.075 \cdot \sqrt{\frac{m}{p} \cdot (273 + \theta_2) \cdot \left(0.7692 + \frac{\theta_1 - \theta_2}{1718 + 1.299 \cdot \theta_2}\right)}$$

wherein $d_2$=diameter of the aperture in the lower part of the retardation zone, $d_3$=diameter of the aperture in the upper part of the retardation zone, m=mass flow (kg/s) of the combustion gas, p=total pressure (bar) of the combustion gas, $\theta_1$=initial temperature (° C.) of the combustion gas, $\theta_2$=end temperature (° C.) of the combustion gas, $D_{50}$=median diameter ($\mu$m) of the drops.

16. A method for cleaning impurities from combustion gas, according to claim 15, wherein the height of said retention zone is given by the equation:

$$h_2 = \frac{4 \cdot G2 \cdot G3}{\pi \cdot d_3^2}$$

wherein the terms G2 and G3 are defined by the following equations:

$$F1 = \frac{\pi \cdot d_2^2 + \pi \cdot d_1^2}{8} \cdot h_1$$

$$F2 = \frac{\theta_1 - \theta_2}{\ln \frac{\theta_1}{\theta_2}}$$

$$F3 = \frac{m}{p} \cdot 2.858 \cdot (273 + F2) \cdot 10^{-3}$$

$$G1 = F1/F3$$

$$G2 = 5.0 - G1$$

$$G3 = F3 \cdot \frac{(273 + \theta_2)}{273 + F2}$$

and wherein $h_1$=height of the conical retardation zone, $d_1$=diameter of combustion gas supply means, $d_2$=diameter of the aperture in the lower part of the retardation zone, $d_3$=diameter of the aperture in the upper part of the retardation zone, m=mass flow (kg/s) of the combustion gas, p=total pressure (bar) of the combustion gas, $\theta_1$=initial temperature (° C.) of the combustion gas, $\theta_2$=end temperature (° C.) of the combustion gas.

17. A method for cleaning impurities from combustion gas, according to claim 1, wherein said retardation zone is a conic section having an upwardly opening cone angle of from about 10° to about 20° and wherein the geometry of said retardation zone is defined by the equation:

$$\tan\alpha = \frac{(d_3 - d_2)}{2 \cdot h_1}$$

and wherein $\alpha$=upwards opening conical angle, $h_1$=height of the conical retardation zone $h_1$, $d_2$=diameter of the aperture in the lower part of the retardation zone, and $d_3$=diameter of the aperture in the upper part of the retardation zone.

18. A method for cleaning impurities from combustion gas, according to claim 17, wherein said upwardly opening conical angle is about 15°.

19. A method for cleaning impurities from combustion gas, according to claim 1, wherein said retention zone is substantially cylindrical, and has a diameter substantially equivalent to the diameter of the aperture in the upper part of said retardation zone.

20. A method for cleaning impurities from combustion gas, according to claim 1, wherein said top of said reactor vault comprises:

a downwardly opening conic section having an opening in the narrow end of said conic section; and an exhaust stack for said combustion gas attached to said top wherein said opening in said narrow end conducts said combustion gas into said exhaust stack.

21. A method for cleaning impurities from combustion gas, according to claim 20, wherein said opening and said exhaust stack are coaxial with said reaction vault.

22. A method for cleaning impurities from combustion gas, according to claim 21, wherein said exhaust stack directs said combustion gas to a filter.

23. A method for cleaning impurities from combustion gas, according to claim 22, wherein said filter is a fiber filter.

24. A method for cleaning impurities from combustion gas, according to claim 22, wherein said filter is a dust removal filter.

* * * * *